US010223460B2

(12) United States Patent
Lee et al.

(10) Patent No.: US 10,223,460 B2
(45) Date of Patent: Mar. 5, 2019

(54) APPLICATION PARTIAL DEEP LINK TO A CORRESPONDING RESOURCE

(71) Applicant: Google LLC, Mountain View, CA (US)

(72) Inventors: Dong Ha Lee, Palo Alto, CA (US); Jaehyun Yeom, Mountain View, CA (US)

(73) Assignee: Google LLC, Mountain View, CA (US)

( * ) Notice: Subject to any disclaimer, the term of this patent is extended or adjusted under 35 U.S.C. 154(b) by 501 days.

(21) Appl. No.: 14/835,182

(22) Filed: Aug. 25, 2015

(65) Prior Publication Data

US 2017/0061010 A1 Mar. 2, 2017

(51) Int. Cl.
G06F 17/30 (2006.01)

(52) U.S. Cl.
CPC .. *G06F 17/30867* (2013.01); *G06F 17/30321* (2013.01); *G06F 17/30528* (2013.01); *G06F 17/30554* (2013.01); *G06F 17/30864* (2013.01); *G06F 17/30876* (2013.01)

(58) Field of Classification Search
CPC ......... G06F 17/30321; G06F 17/30528; G06F 17/30554; G06F 17/30864; G06F 17/30867; G06F 17/30876
See application file for complete search history.

(56) References Cited

U.S. PATENT DOCUMENTS

| 7,984,037 | B2 | 7/2011 | Wan |
| 8,042,036 | B1 | 10/2011 | Sharma et al. |
| 8,826,145 | B1 | 9/2014 | Kirkpatrick et al. |
| 2004/0139169 | A1 | 7/2004 | O |
| 2007/0198741 | A1* | 8/2007 | Duffy ................. G06F 17/3089 709/245 |
| 2007/0220083 | A1 | 9/2007 | Kothari et al. |
| 2007/0297417 | A1* | 12/2007 | Cohen .................... H04L 45/04 370/395.42 |
| 2008/0244381 | A1* | 10/2008 | Nicolaou ............ G06F 17/2745 715/234 |

(Continued)

FOREIGN PATENT DOCUMENTS

| JP | 2009-530736 | 8/2009 |
| JP | 2015-501496 | 1/2015 |

(Continued)

OTHER PUBLICATIONS

International Search Report and Written Opinion in International Application No. PCT/US2016/045722, dated Nov. 15, 2016, 12 pages.

(Continued)

*Primary Examiner* — Dinku W Gebresenbet
(74) *Attorney, Agent, or Firm* — Fish & Richardson P.C.

(57) ABSTRACT

Methods, systems, and apparatus, for generation partial deep links to a resource. In an aspect, a system determines that a resource identified by a resource address includes portion identifiers and respectively corresponding native application partial deep links. Each portion identifier identifies a portion of content that is a proper subset of the content to be rendered in the browser environment, the proper subset of content being different from the proper subsets of content identified by the other portion identifiers. The native application partial deep link identifies a native application that is to be used to render the portion of content identified by the portion identifier and a partial deep link for the native application that uniquely corresponds to the portion identifier to identify the proper subset of content. The system generates a mapping that maps the resource address to the native application partial deep link.

15 Claims, 6 Drawing Sheets

(56) References Cited

U.S. PATENT DOCUMENTS

| | | | |
|---|---|---|---|
| 2010/0306191 A1* | 12/2010 | LeBeau | G06F 17/30864 |
| | | | 707/723 |
| 2012/0179955 A1* | 7/2012 | French | G06F 17/30899 |
| | | | 715/207 |
| 2013/0111328 A1 | 5/2013 | Khanna et al. | |
| 2013/0304729 A1 | 11/2013 | Jiang et al. | |
| 2014/0059420 A1 | 2/2014 | Cole | |
| 2014/0250106 A1 | 9/2014 | Shapira et al. | |
| 2014/0280919 A1 | 9/2014 | Lakes | |
| 2014/0365462 A1 | 12/2014 | Chang | |

FOREIGN PATENT DOCUMENTS

| | | |
|---|---|---|
| KR | 10-2012-0040160 | 4/2012 |
| WO | 2007/096603 | 8/2007 |
| WO | 2014/149874 | 9/2014 |

OTHER PUBLICATIONS

'Publish Your Deep Links,' [online][Retrieved on Aug. 25, 2015]; Retrieved from the Internet URL: https://developers.google.com/app-indexing/android/publish; 7 pages.

'Fragment identifier,' [online][Retrieved on Aug. 25, 2015]; Retrieved from the Internet URL: https://en.wikipedia.org/wiki/Fragment_identifier; 6 pages.

KR Office Action issued in Korean Application No. 10-2017-7031228, dated Dec. 14, 2018, 14 pages (with English translation).

JP Office Action issued in Japanese Application No. 2017-556914, dated Dec. 21, 2018, 8 pages (with English translation).

* cited by examiner

APPLICATION PARTIAL DEEP LINK TO A CORRESPONDING RESOURCE

BACKGROUND

The Internet provides access to a wide variety of information. For example, digital image files, video and/or audio files, as well as web page resources for particular subjects or particular news articles, are accessible over the Internet. With respect to web page resources, many of these resources are designed to facilitate the performing of particular functions, such as banking, booking hotel reservations, shopping, etc., or to provide structured information, such as on-line encyclopedias, movie databases, etc.

A variety of search engines are available for identifying particular resources accessible over the Internet. These search engines crawl and index the various web page resources. The search engines then use the indexes to determine which resources are most responsive to search queries and provide search results that link to the resources in response to the queries.

With the advent of tablet computers and smart phones, native applications that facilitate the performance of the same or similar functions facilitated by the use of web page resources, and that provide the same or similar content, are now being provided in large numbers.

SUMMARY

This specification relates to identifying native application content that has corresponding content on a web page.

In general, one innovative aspect of the subject matter described in this specification can be embodied in a method that includes the actions of determining that a resource identified by a resource address defines content to be rendered in a browser environment, the resource including a plurality of portion identifiers and respectively corresponding native application partial deep links, each portion identifier different from each other portion identifier, and wherein for each portion identifier: the portion identifier identifies a portion of content that is a proper subset of the content to be rendered in the browser environment, the proper subset of content being different from the proper subsets of content identified by the other portion identifiers, and the native application partial deep link identifies a native application that is to be used to render the portion of content identified by the portion identifier and a partial deep link for the native application that uniquely corresponds to the portion identifier to identify the proper subset of content; generating a mapping that maps the resource address to the native application partial deep links; and storing the mapping in a map index.

Another innovative aspect of the subject matter described in this specification can be embodied in a method that includes the actions of receiving, at a user device in response to a search query, a plurality of search results, wherein at least one search result includes a partial deep link, wherein: the partial deep link identifies a native application that is to be used to render a portion of content identified by a portion identifier in a resource identified by a resource address that is different from the partial deep link, the portion of content is a subset of content that is rendered by a user device when in response to requesting the resource at the resource address, and in response to a selection of the search result, the partial deep link causes the user device to instantiate the native application and request the portion of content identified by the portion identifier; selecting the search result that includes the partial deep link; and in response to the selection, requesting and receiving the portion of content and displaying the portion of content in an instance of the native application.

Particular embodiments of the subject matter described in this specification can be implemented so as to realize one or more of the following advantages. The mapping of native application environments to corresponding portions of a webpage enables more accurate and efficient content verification by a search engine. The content verification ensures that the content presented by the application is consistent with content of a corresponding portion of web site before indexing a link for the native application for the content. The verification ensures that the search engine, when serving native application search results responsive to a query, is providing access to information that will satisfy users' informational needs. Because the content verification is based on a portion of a webpage, the verification process is more robust than verification processes that consider all the data of a corresponding web page. This results in fewer content validation failures and fewer verification processing steps, which, in turn, frees up computer resources that are required for verification and indexing of content. This results in an improvement of the technological field of content indexing and search.

In some implementations, a search engine need only index the content that is provided in a consistent manner by a website and by native applications in one index, and not separately in an index for web resources and another index for native applications. This reduces overall maintenance of the two corpora.

In some implementations, the validation facilitates the serving of native application search results for native applications that are known to provide consistent content with a web resource. Thus, the web resource can be used as scoring proxy for the native application. This allows for a consistent scoring between a native application and a corresponding resource when scoring and ranking search results.

Finally, by using a variety of content verification techniques, the verification process is robust with respect to various formatting and display differences between the native application and a corresponding web resource.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
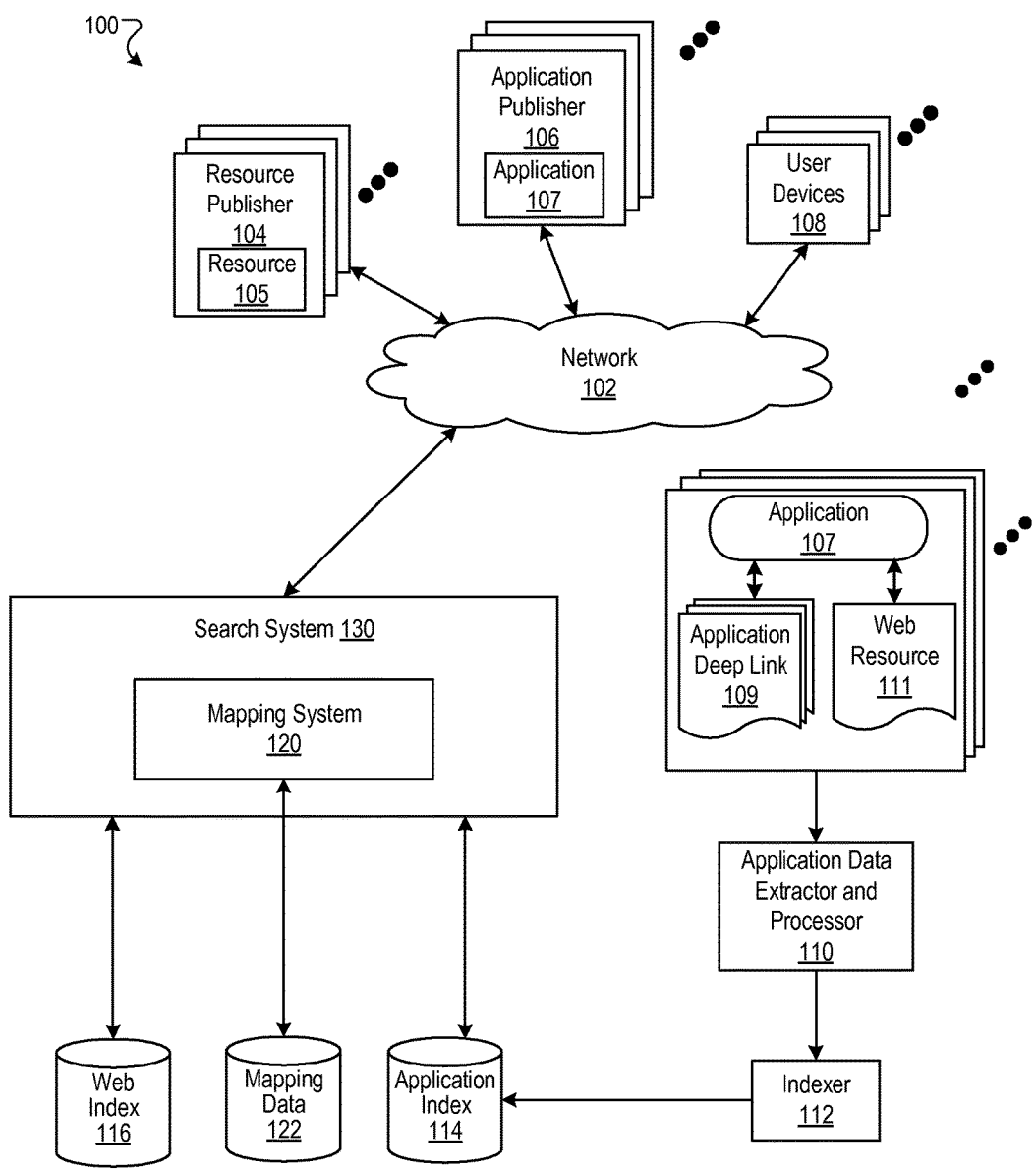
FIG. 1A is a block diagram of an environment in which native application partial deep links are mapped to resource addresses.

As used herein, a native application generates environment instances for display on a user device within an environment of the native application and operates independent of a browser application on the user device. A native application is an application specifically designed to run on a particular user device operating system and machine firmware. Native applications thus differ from browser-based applications and browser-rendered resources. The latter require all, or at least some, elements or instructions downloaded from a web server each time they are instantiated or rendered. Furthermore, browser-based applications and browser-rendered resources can be processed by all web-capable mobile devices within the browser and thus are not operating system specific.

Native applications for mobile and tablet devices typically have a much smaller display area than the display area of a desktop or laptop device. Thus, a resource that is published for a desktop-sized display and that includes multiple different sections will often have several or more sections of content rendered outside the viewport on a device with a smaller display. This degrades the user experience, as the user must navigate within the viewport to find the information that may be of interest to the user. This problem is exacerbated when the resource is provided in response to the selection of a search result that itself may include a snippet of information that the user finds interesting.

Disclosed herein is a system that determines the presence of native application partial deep links and maps the native application partial deep links to corresponding resource addresses. In operation, the system accesses a resource identified by a resource address that defines content to be rendered in a browser environment. The system determines the resource includes portion identifiers and respectively corresponding native application partial deep links. Each portion identifier is different from each other portion identifier, and identifies a portion of content that is rendered in the browser environment. The content identified by each portion identifier is different from the content identified by other portion identifiers. The native application partial deep link identifies a native application that is to be used to render the portion of content identified by the portion identifier and a partial deep link for the native application that uniquely corresponds the portion identifier to identify the proper subset of content. The system maps the resource address to the native application partial deep links and stores the mapping in an index. The system may then verify content of a native application partial deep link by comparing the content provided by the native application when accessing the partial deep link to the content of the resource identified by the corresponding portion identifier.

For example, a restaurant may have a website and a corresponding native application. At the restaurant website, a resource (e.g., web page) may include information about the particular restaurant, and within a portion of the resource, reviews of that particular restaurant may be included. The portion identifier may be included in the hypertext markup language (HTML) of the resource to identify the particular portion of content provided in the resource (e.g., the portion identifier may identify a reviews portion of the resource). A mapping may be performed, for example, by a crawling operation, to generate a mapping between native application partial deep links, identified by a portion identifier, and associated resource addresses of the resource where the particular portion of content is located. As described below, when a native application partial deep link for the native application of the restaurant is selected, a native application will present content referenced by the deep link. For the restaurant review portion content, the search engine may access the content of the web page labeled by the portion identifier and the content presented by the native application to verify the content of the native application.

These features and additional features are described in more detail below.

FIG. 1A is a block diagram of an example environment 100 in which native application partial deep links are mapped to resource addresses. A computer network 102, such as the Internet, connects resource publisher websites 104, application publishers 106, user devices 108 and a search system 130.

A resource publisher website 104 includes one or more web resources 105 associated with a domain and hosted by one or more servers in one or more locations. Generally, a resource publisher website is a collection of web pages formatted in hypertext HTML that can contain text, images, multimedia content, and programming elements. Each website 104 is maintained by a content publisher, which is an entity that controls, manages and/or owns the website 104.

A web page resource is any data that can be provided by a publisher website 104 over the network 102 and that has a resource address, e.g., a uniform resource locator (URL). Web resources may be HTML pages, images files, video files, audio files, and feed sources, to name just a few. The resources may include embedded information, e.g., meta information and hyperlinks, and/or embedded instructions, e.g., client-side scripts. More generally, a "resource" is anything identifiable over a network, and can also include native applications.

An application publisher website 106 may also include one or more web resources 105, and also provides native applications 107. As described above, a native application 107 is an application specifically designed to run on a particular user device operating system and machine firmware. Native applications 107 may include multiple versions designed to run on different platforms. For example, native applications corresponding to a movie database website may include a first native application that runs on a first type of smart phone, a second native application that runs on a second type of smart phone, a third native application that runs on a first type of tablet, etc.

As used in this specification, an "environment instance" is a display environment within a native application and in which is displayed content, such as text, images, and the like. An environment instance is specific to the particular native application, and the native application is specific to the particular operating system of the user device 108. An environment instance differs from a rendered web resource in that the environment instance is generated within and specific to the native application, while a web resource may be rendered in any browser environment for which the web page resource is compatible, and is independent of the operating system of the user device.

A user device 108 is an electronic device that is under the control of a user. A user device 108 is typically capable of requesting and receiving web page resources 105 and native applications 107 over the network 102. Example user devices 108 include personal computers, mobile communication devices, and tablet computers.

To search the various websites and native applications (and, optionally, other data sources), the user devices 108 submits search queries, to the search system 130. To search web resources 105 and the native applications 107 in response to the query, the search system 130 accesses an application index 114 and a web index 116. The application index 114 is an index of application pages for native applications 107, and is constructed using an application data extractor and processor 110 and an indexer 112. The web index 116 is an index of web resources 105 that has, for example, been built from crawling the publisher websites 104. In response to each query, the search system 130 accesses the web index 116 and, optionally, the application index 114 to identify resources and native applications that are relevant to the query. Although shown as separate indexes, the web index 116 and the application index 114 can be combined in a single index.

The search system 130 may, for example, identify the resources and applications in the form of web resource search results and native application search results, respectively. Once generated, the search results are provided to the user device 108 from which the query was received.

A web resource search result is data generated by the search system 130 that identifies a web resource, based on the content of the resource that satisfies a particular search query. A web resource search result for a resource can include a web page title, a snippet of text extracted from the resource, and a uniform resource identifier (URI) for the resource, e.g., the uniform resource locator (URL) of the web page. When selected at a user device, the web resource search result causes the user device to generate a request for the resource located at the URL. The web resource that is received is then displayed in a browser application.

A native application search result specifies a native application and, optionally, a native application deep link. When selected at a user device, the native application search result causes the native application installed on the user device to request the consistent content. Once the native application receives the requested content, the native application displays the content in a user interface of the native application.

In some implementations, a publisher of a web page may specify for native application deep links that correspond to particular portions of a web page within the web page itself by use of portion identifiers and a deep link for the native application embedded within the web page code. Such deep links are referred to as "partial deep links," as each partial deep link corresponds to a sub-portion of content of the web page (i.e., a proper subset of the web page content). A mapping system 120 may access the portion identifiers and deep link for the native application, and generate mapping data 122 that maps a web page resource to the respective partial deep links.

Figure 1B:
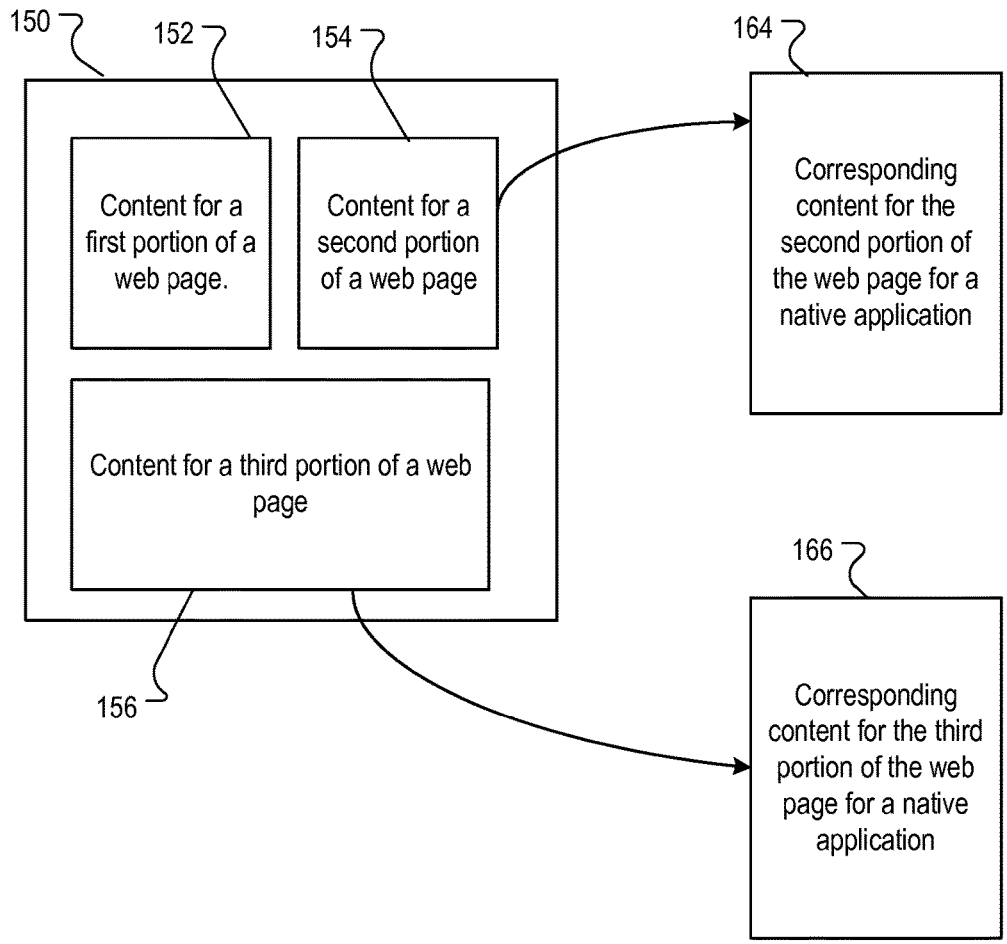
FIG. 1B is a block diagram illustrating content portions in a web page and corresponding environment instances of a native application for some of the content portions.

The relation between a web page with portion identifiers and a corresponding native application is illustrated in FIG. 1B, which is a block diagram illustrating content portions 152, 154 and 156 in a web page 150 and corresponding environment instances 164 and 166 of a native application for some of the content portions. Content portions 154 and 156, which are defined by code that is used to render the web page 150, are identified by portion identifiers and partial deep links for a corresponding native application. The partial deep links, when respectively accessed by the native application, will cause the native application to display corresponding content 164 and 166. Another portion 152 of the web page 150 does not have a portion identifier, and thus there is not a corresponding partial deep link for the content in the portion 152 of the web page 150.

Mapping system 120 may access web index 116 and application index 114 to identify relations between web page URLs and application URIs. Specifically, mapping system 120 may identify relations between resource addresses and native application partial deep links, and store the results in mapping data 122.

Figure 2A:
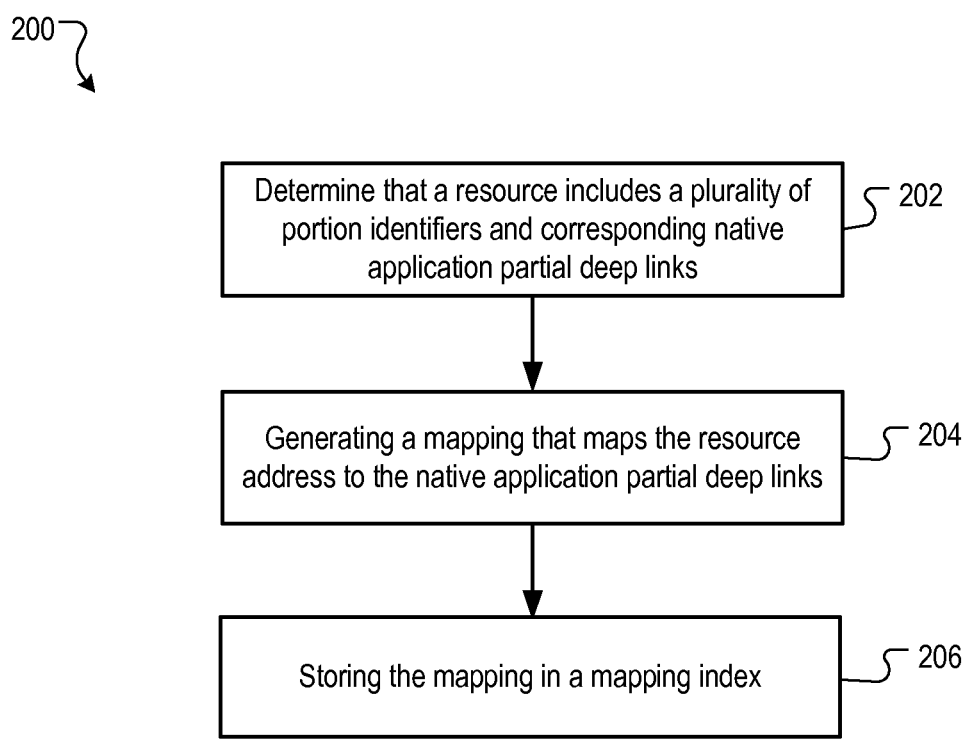
FIG. 2A is a flow chart of an example process of mapping native application partial deep links to resource addresses.

One example process for generating the mapping data is described with reference to FIG. 2A, is a flow chart of an example process 200 of mapping native application partial deep links to resource addresses. The process 200 can, for example, be implemented by the mapping system 120. In some implementations, the operations of the example process 200 can be implemented as instructions stored on a non-transitory computer readable medium, where the instructions cause a data processing apparatus to perform operations of the example process 200.

The process 200 determines that a resource includes a plurality of portion identifiers and corresponding native application partial deep links (202). For example, in the context of a mark-up language resource, e.g., XHTML, HTML, XML, one or more portion identifiers may be included in a resource. In some implementations, the portion identifiers may be identified by fragment attributes within the code of the resource. For other types of resource code, any data structure that identifies a sub-portion of the content of the resource may be used as a portion identifier. The portion identifier may be any node, sub-node, partial node, or any other type of hypertext element. Additionally, other types of portion identifiers may be used, such as byte indexes of starting and ending points of the particular portion.

For example, consider the following mark-up language for a resource having a URL of android.example.com:

```
<html>
<head>
...
<link rel="alternate" href="androidapp://com.example.android/foo" />
<link rel="alternate" deeplinkid="bar" href="androidapp://com.example.android/foo_bar" />
<link rel="alternate" deeplinkid="car" href="androidapp://com.example.android/foo_car" />
<link rel="alternate" deeplinkid="dar" href="androidapp://com.example.android/foo_dar" />
...
innerHTML A
</head>
<body>
innerHTML B
<deeplinkid id="bar" ...>
innerHTML C
</div>
<deeplinkid id="car" ...>
innerHTML D
</div>
<deeplinkid id="dar" ...>
innerHTML E
</div>
</body>
```

The resource includes a corresponding deep link for the entire content of the resource, and three partial deep links for portions of the resource. The "link" tag is used for a whole-page deep link "androidapp://com.example.android/foo" for a native application "androidapp." Here, the whole-page deep link includes the stem "foo." Because there is no portion identifier for this deep link, the deep link should include all the content that is included on the web page resource.

There are also three additional partial deep links for the native application, "androidapp://com.example.android/foo_bar," "androidapp://com.example.android/foo_car," and "androidapp://com.example.android/foo_dar." Each link attribute that is used to declare each respective partial deep link includes a portion identifier, identified by the attribute "deeplinkid." In the case of a mark-up language, the portion identifier can be in the form of a mark-up tag. The respective portion attributes are "bar," "dar," and "car." With the code of web page are div attributes "bar," "dar," and "car," and each defines a section of HTML. In particular, the div attribute "bar" corresponds to innerHTML C; the div attribute "car" corresponds to innerHTML D; and the div attribute "dar" corresponds to innerHTML D.

In the implementation shown, the partial deep link for a portion identifier is formed by the whole deep link and the portion identifier appended to the partial deep link. This indicates to the system 120 that the content that should be used to verify the respective content shown by the native application for the deep link "androidapp://com.example.android/foo_bar," is the content of innerHTML C; for the deep link "androidapp://com.example.android/foo_car," innerHTML D; and for the deep link "androidapp://com.example.android/foo_dar," innerHTML E.

However, in other implementations, the partial deeplink can also be uniquely associated with a portion identifier with some other unique text. For example, the following scheme could be used:

```
<html>
<head>
...
<link rel="alternate" href="androidapp://com.example.android/foo" />
<link rel="alternate" deeplinkid="bar" href="androidapp://com.example.android/AA" />
<link rel="alternate" deeplinkid="car" href="androidapp://com.example.android/BB" />
<link rel="alternate" deeplinkid="dar" href="androidapp://com.example.android/CC" />
...
innerHTML A
</head>
<body>
innerHTML B
<deeplinkid id="bar" ...>
innerHTML C
</div>
<deeplinkid id="car" ...>
innerHTML D
</div>
<deeplinkid id="dar" ...>
innerHTML E
</div>
</body>
```

Here, the values AA, BB, and CC uniquely correspond to the portion identifiers bar, car and dar, respectively.

The mapping system 120 may access the web index 116 generated by the search system 130 to identify portion identifiers and native application deeplinks embedded in the resources.

The process 200 generates a mapping that maps the resource address to the native application partial deep link (204). Once a portion identifier is found, then the resource address and native application partial deep link may be mapped, and stored in a mapping index of mapping data 122. In the example above, the mapping system 120 may generate the following mapping for the partial deep links:

| URL | Partial Deep Links for "androidapp" |
| --- | --- |
| Android.example.com#bar | com.example.androidapp/foo_bar |
| Android.example.com#car | com.example.androidapp/foo_car |
| Android.example.com#dar | com.example.androidapp/foo_dar |

In some implementations, the mapping system 120 may store the content of the resource that is identified by the portion identifier of the native application deep link in the mapping data 122 along with the mapping between the resource address and the native application partial deep link. For the example above, the mapping system 120 may capture the data and HTML content identified by each deeplinkid attribute (e.g., the content of "innerHTML C" from the portion identifier "bar," as so on).

In some implementations, the content of the resource may be the content that is actually served by the native application when the deep link is accessed, i.e., the native application may render the code fragment identified by the portion identifier. In other implementations, the content of the portion of the resource is used to verify the content that is served by the partial deep link of the native application. The verification may be used to ensure that a native application partial deep link that is served with a web resource does indeed reference content that is consistent with the portion of the web resource to which it corresponds.

If the content analyzed between the native application partial deep link and the corresponding proper subset of content at the resource are determined to not be consistent, then the mapping system 120 may prevent, or otherwise disable, the native application partial deep link from being presented as part of a search result.

Figure 2B:
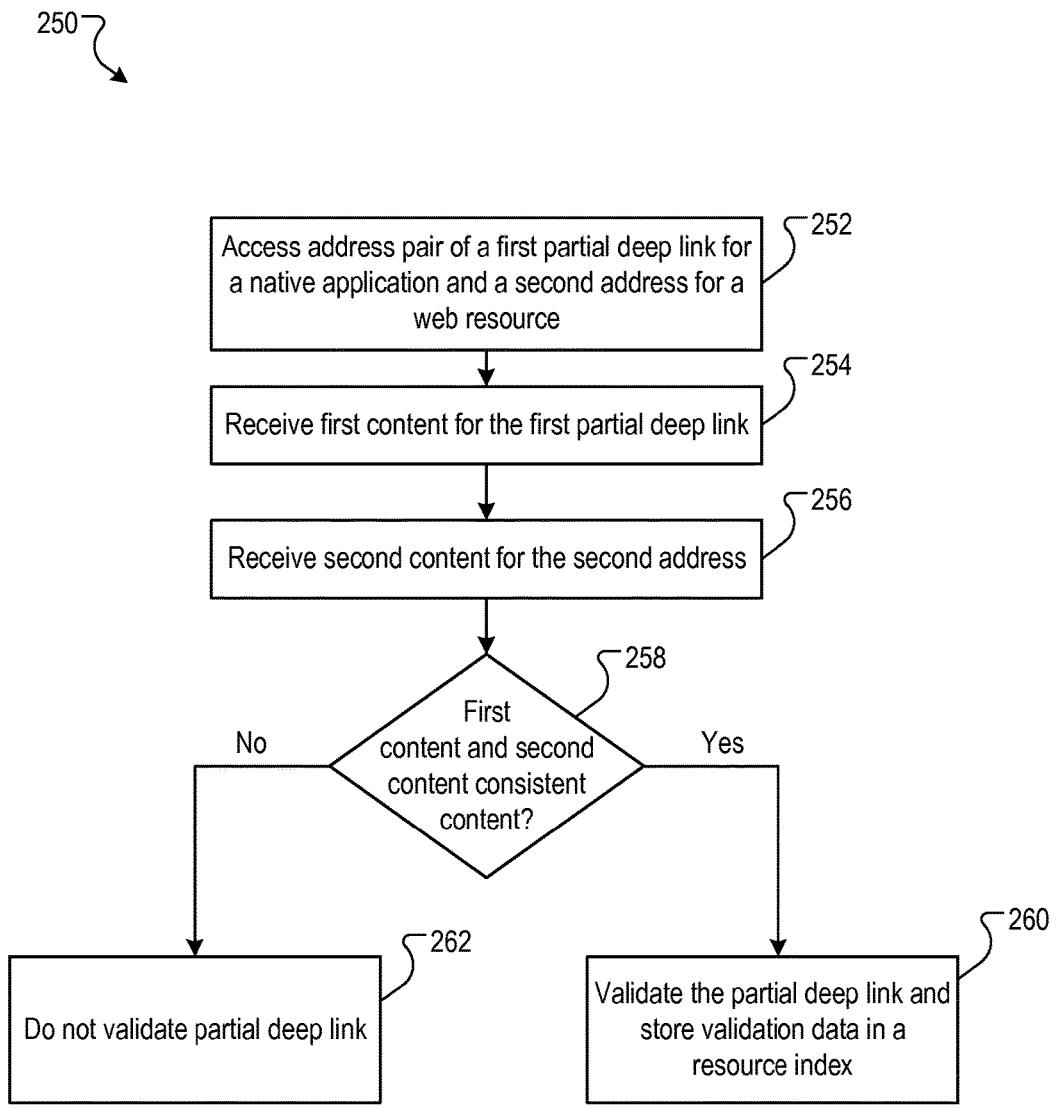
FIG. 2B is a flow diagram of an example process for verifying native application content of partial deep links.

FIG. 2B is a flow diagram of an example process 250 for verifying native application content of partial deep links. The process 250 can be implemented in a data processing apparatus of one or more computers in data communication in the same manner that the process 200 is implemented.

The process 250 accesses an address pair of a first partial deep link for a native application and a second address for a web resource (252). For each pair, the first partial deep link is accessible by the native application and specifies a location from which the native application receives first content, and each second address is an address for a web resource that respectively provides second content. Again, the address pairs determined by the mapping system 120 as described above.

The process 250 receives first content for the first partial deep link (254). The mapping system 120, for example, may execute the native application and monitor data that is received in response to the content requests of the native application. The content can be collected in a variety of ways. For example, a data processing apparatus can be instrumented to interrogate text handlers, list handlers and view handlers of the native application to extra text and image data for processing. Alternatively or in addition, responses to content requests can be monitored and data extracted from the responses. Other appropriate ways of collection data provided to and/or displayed by the native application can also be used.

The process 250 receives second content for the second address (256). In the case of a web resource, the content identified by the portion identifier in the web resource is extracted as the second content.

The process 250 determines if the first content and the second content are consistent content (258). The content is determined to be consistent if one or more comparison processes, such as entity matching, n-gram similarity, phrase matching, and feature similarity, indicate a threshold level of consistency between the first and second content.

If the process 250 determines that the first content and the second content are consistent content, then the process 250 validates the address pair and stores validation data in a resource index (260). For example, a record for a URL in the web index 116 may be updated to include the address for the native application partial deep link, and an identifier of the native application. This search system 130, when processing search results at a later time, can then generate a corresponding native application search result if the web resource referenced by the URL is to be provided to a user device as a web search result.

Conversely, if the process 250 does not determine that the first content and the second content are consistent content, then the process 250 does not validate the address pair (262). Thus, for native application addresses that are determined to not have content consistent with a corresponding web resource, a native application search result for that address will not be generated.

Figure 3:
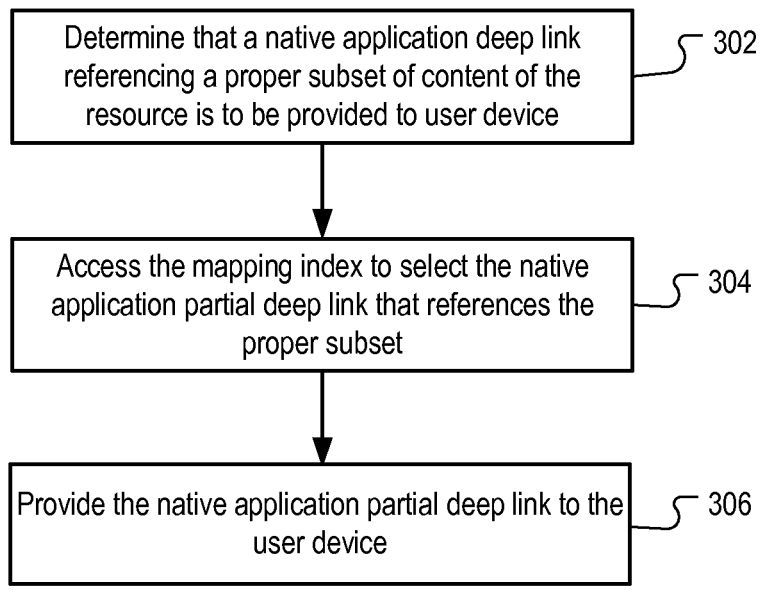
FIG. 3 is a flow chart of an example process for providing a native application partial deep link referencing one of the proper subsets of content of the resource to the user device.

Once a partial deep link is verified, the search system 130 may provide the partial deep link when content of the resource to which the partial deep link corresponds is determined to be responsive to a query. FIG. 3 is a flow chart of an example process 300 for providing a native application partial deep link referencing one of the proper subsets of content of the resource to the user device 108. In some implementations, the operations of the example process 300 can be implemented as instructions stored on a non-transitory computer readable medium, where the instructions cause a data processing apparatus to perform operations of the example process 300.

A native application deep link referencing one of the proper subsets of content of the resource is determined to be provided to the user device (302). For example, the search system 130 may determine that content of the resource to which the partial deep link corresponds is determined to be responsive to a query, and that a native application search result (or deep link) should be provided to the user device. The former determination may be made based on a relevance score of the proper subset of content identified by the portion identifier to a query. The latter determination may be based on the native application being installed on the user device, for example.

Process 300 accesses the mapping index to select the native application partial deep link that references the particular proper subset of content (304). The mapping index in mapping data 122 may be accessed to locate the native application partial deep link that references the proper subset of content, which is identified by the portion identifier.

The process 300 then provides the native application partial deep link to the user device (306). The partial deep link may be provided as part of a separate native application search result, or may be provided as a second link in a web resource search result.

Figure 4:
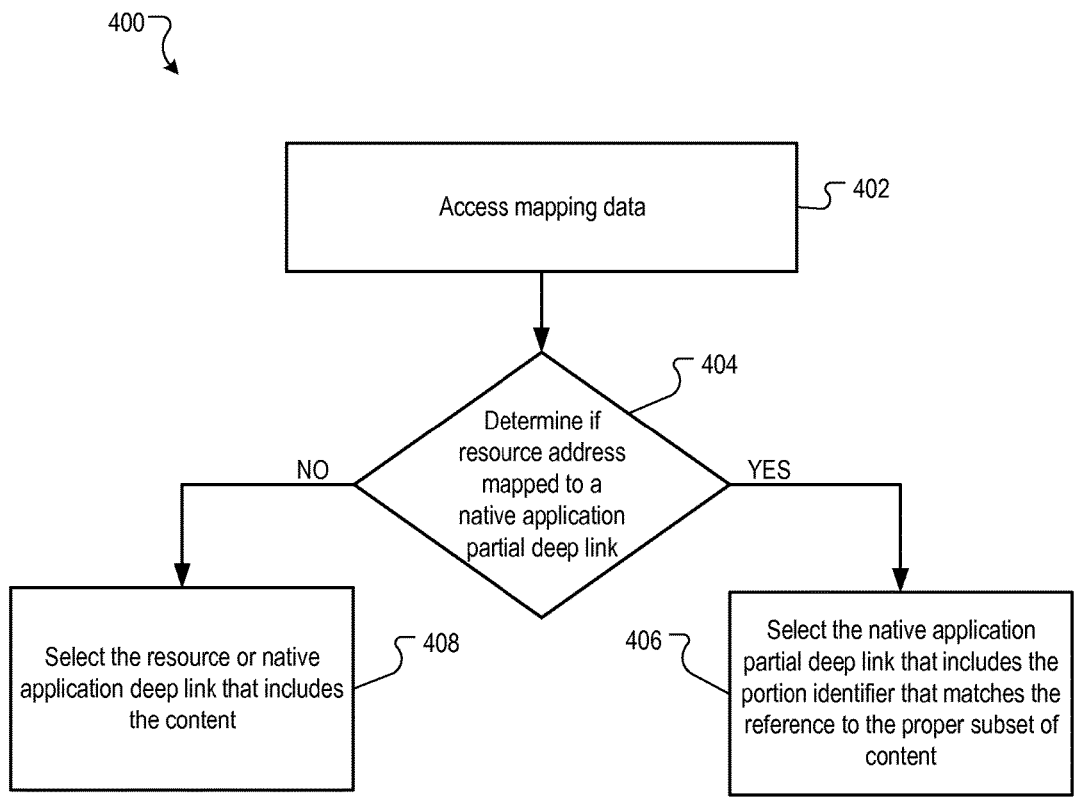
FIG. 4 is a flow chart of an example process for providing a native application partial deep link in search results.

FIG. 4 is a flow chart of another example process 400 for providing a native application partial deep link in search results. The process 400 can provide partial native application search results in response to portion identifiers being included in web resource content.

Process 400 accesses the mapping data (402), and determines, from the mapping data, if the resource address of the resource is mapped to a native application partial deep link (404).

Where the resource address is mapped to a native application partial deep link, the mapped native application partial deep link that includes the portion identifier that matches the reference to the proper subset of content is selected (406) and provided in a search result. However, where it is determined that a resource address provided in the search results is not mapped to a native application partial deep link, then only the resource address of the resource is provided in a search result (408).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   determining, by a data processing apparatus, that a web page resource identified by a resource address defines content within the web page resource that is to be rendered in a browser environment as part of the web page resource, the web page resource including a plurality of portion identifiers and respectively corresponding native application partial deep links, each portion identifier different from each other portion identifier, and wherein for each portion identifier:
   the portion identifier identifies a portion of content within the web page resource that is a proper subset of the content within the web page resource to be rendered in the browser environment, the proper subset of content being different from the proper subsets of content identified by the other portion identifiers; and the native application partial deep link identifies a native application that is to be used to render the portion of content identified by the portion identifier and a partial deep link for the native application that uniquely corresponds to the portion identifier to identify the proper subset of content;

generating, by the data processing apparatus, a mapping that maps the resource address to the native application partial deep links; and storing the mapping in a map index;

wherein:

the web page resource, when rendered in the browser environment, includes each of the proper subsets of content identified by the portion identifiers; and each partial deep link is used to generate a corresponding deep link for the native application and that, when processed by the native application, causes the native application to render only the proper subset of content that corresponds to the partial deep link and not render the proper subsets of content that corresponds to the other partial deep links.

2. The method of claim 1, further comprising:

determining that a native application deep link referencing one of the proper subsets of content of the resource is to be provided to a user device;

in response, accessing the mapping index to select the native application partial deep link that references the one of the proper subsets of content; and providing the native application partial deep link to the user device.

3. The method of claim 2, wherein accessing the mapping index to select the native application partial deep link that references the one of the proper subsets of content comprises:

accessing the map index to determine whether the resource address of the resource is mapped to native application partial deep links; and in response to a positive determination, selecting the native application partial deep link that includes a portion identifier that matches the reference to the proper subset of content.

4. The method of claim 3, wherein the search results include the native application partial deep link and a link to the resource address mapped to the native application partial deep link.

5. The method of claim 1, wherein the portion identifier is at least one of a fragment and a byte index.

6. The method of claim 1, further including:

capturing, by the data processing apparatus, content designated by the portion identifier within the resource, the resource being associated with the resource address mapped to the native application partial deep link; and storing, by the data processing apparatus, the captured content designated by the portion identifier within the resource.

7. The method of claim 1, further including:

identifying, by the data processing apparatus, at least part of the content within the native application partial deep link page; and determining, by the data processing apparatus, that the identified content of the native application deep link page matches the content within the resource associated with the resource address mapped to the native application partial deep link.

8. A system, comprising:

a processor; and a computer-readable medium coupled to the processor and having instructions stored thereon, which, when executed by the processor, cause the processor to perform operations comprising:

determining, by a data processing apparatus, that a web page resource identified by a resource address defines content within the web page resource that is to be rendered in a browser environment as part of the web page resource, the web page resource including a plurality of portion identifiers and respectively corresponding native application partial deep links, each portion identifier different from each other portion identifier, and wherein for each portion identifier:

the portion identifier identifies a portion of content within the web page resource that is a proper subset of the content within the web page resource to be rendered in the browser environment, the proper subset of content being different from the proper subsets of content identified by the other portion identifiers; and the native application partial deep link identifies a native application that is to be used to render the portion of content identified by the portion identifier and a partial deep link for the native application that uniquely corresponds to the portion identifier to identify the proper subset of content;

generating, by the data processing apparatus, a mapping that maps the resource address to the native application partial deep links; and storing the mapping in a map index;

wherein:

the web page resource, when rendered in the browser environment, includes each of the proper subsets of content identified by the portion identifiers; and each partial deep link is used to generate a corresponding deep link for the native application and that, when processed by the native application, causes the native application to render only the proper subset of content that corresponds to the partial deep link and not render the proper subsets of content that corresponds to the other partial deep links.

9. The system of claim 8, the operations further comprising:

determining that a native application deep link referencing one of the proper subsets of content of the resource is to be provided to a user device;

in response, accessing the mapping index to select the native application partial deep link that references the one of the proper subsets of content; and providing the native application partial deep link to the user device.

10. The system of claim 9, wherein accessing the mapping index to select the native application partial deep link that references the one of the proper subsets of content comprises:

accessing the map index to determine whether the resource address of the resource is mapped to native application partial deep links; and in response to a positive determination, selecting the native application partial deep link that includes a portion identifier that matches the reference to the proper subset of content.

11. The system of claim 10, wherein the search results include the native application partial deep link and a link to the resource address mapped to the native application partial deep link.

12. The system of claim 8, wherein the portion identifier is at least one of a fragment and a byte index.

13. The system of claim 8, further including:
capturing, by the data processing apparatus, content designated by the portion identifier within the resource, the resource being associated with the resource address mapped to the native application partial deep link; and
storing, by the data processing apparatus, the captured content designated by the portion identifier within the resource.

14. The system of claim 8, further including:
identifying, by the data processing apparatus, at least part of the content within the native application partial deep link page; and
determining, by the data processing apparatus, that the identified content of the native application deep link page matches the content within the resource associated with the resource address mapped to the native application partial deep link.

15. A non-transitory computer-readable medium having instructions stored thereon, which, when executed by a processor, cause the processor to perform operations, comprising:
determining, by a data processing apparatus, that a web page resource identified by a resource address defines content within the web page resource that is to be rendered in a browser environment as part of the web page resource, the web page resource including a plurality of portion identifiers and respectively corresponding native application partial deep links, each portion identifier different from each other portion identifier, and wherein for each portion identifier:
the portion identifier identifies a portion of content within the web page resource that is a proper subset of the content within the web page resource to be rendered in the browser environment, the proper subset of content being different from the proper subsets of content identified by the other portion identifiers; and
the native application partial deep link identifies a native application that is to be used to render the portion of content identified by the portion identifier and a partial deep link for the native application that uniquely corresponds to the portion identifier to identify the proper subset of content;
generating, by the data processing apparatus, a mapping that maps the resource address to the native application partial deep links; and
storing the mapping in a map index;
wherein:
the web page resource, when rendered in the browser environment, includes each of the proper subsets of content identified by the portion identifiers; and
each partial deep link is used to generate a corresponding deep link for the native application and that, when processed by the native application, causes the native application to render only the proper subset of content that corresponds to the partial deep link and not render the proper subsets of content that corresponds to the other partial deep links.

* * * * *

UNITED STATES PATENT AND TRADEMARK OFFICE
CERTIFICATE OF CORRECTION

| | | |
|---|---|---|
| PATENT NO. | : 10,223,460 B2 | Page 1 of 1 |
| APPLICATION NO. | : 14/835182 | |
| DATED | : March 5, 2019 | |
| INVENTOR(S) | : Lee et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 543 days.

Signed and Sealed this
Twenty-ninth Day of October, 2019

Andrei Iancu
*Director of the United States Patent and Trademark Office*